United States Patent [19]

Niiranen et al.

[11] Patent Number: 4,678,574
[45] Date of Patent: Jul. 7, 1987

[54] DISC FILTER

[75] Inventors: Tapani Niiranen, Savonlinna; Erkki Savolainen, Haapakallio; Raimo Kohonen, Savonlinna, all of Finland

[73] Assignee: Enzo-Gutzeit OY, Helsinki, Finland

[21] Appl. No.: 804,349

[22] Filed: Dec. 3, 1985

[30] Foreign Application Priority Data

Dec. 3, 1984 [FI] Finland ................................. 844765

[51] Int. Cl.4 ............................................. B01D 33/26
[52] U.S. Cl. .................................... 210/327; 210/331; 210/333.01; 210/486
[58] Field of Search ............... 210/331, 777, 784, 780, 210/332, 327, 324, 486, 333.01, 409, 410, 411, 416.1

[56] References Cited

U.S. PATENT DOCUMENTS 3,283,906 11/1966 Crane et al. .......................... 210/331

Primary Examiner—Frank Sever
Attorney, Agent, or Firm—Toren, McGeady & Associates

[57] ABSTRACT

A method for improving the operation of a disc filter used for the filtering of fluids containing solid matter such as fibers. Known filtering methods have the drawback that the rate of water exhaustion is limited, because a vacuum tends to be created inside the sectors when the filtered fluid is drained by suction from the central channel of the disc filter. This drawback is an obstacle to increasing the speed of rotation and therefore to increasing the capacity of the disc filter. With the method of the present invention, this problem is solved by providing the disc filter with a means of admitting ambient air into the disc sectors and the central shaft channel and/or with equipment for blowing air into the sectors and the channel to remove the filtered fluid from them.

5 Claims, 2 Drawing Figures

DISC FILTER

BACKGROUND OF THE INVENTION

The present invention concerns a method for improving the operation of the disc filter, and a disc filter employing the said method. The disc filter of the invention is especially useful for removing fibers from water.

The disc filters generally employed for filtering off fibers from water consist of a number of filter discs arranged in succession on a rotating shaft and divided into several hollow filter sectors that are operationally independent of each other. Through an aperture at its apex, each sector communicates with the space inside the shaft, where a vacuum is applied. As the filter sector is immersed in the fibrous suspension to be filtered, the water starts flowing, due to the vacuum inside the shaft, through the filtering net into the filter sector, whereby the fibers contained in the water are gathered as a layer on the filtering net. Through the aperture at the apex of the filter sector, the water thus filtered then flows into a channel inside the shaft, said channel being of a length substantially equal to that of the shaft. As the disc filter rotates, all those sectors of the successively arranged discs that are in the same angular position discharge the filtered fluid into the same channel, through which the fluid is exhausted.

The disc filters currently used employ a speed of rotation of 1 rpm. To increase the capacity of the disc filter, it would be an advantage if its speed of rotation could be increased. However, this is impossible with conventional disc filters, because the filtering surfaces of the sectors do not allow enough air to penetrate through them for the water to be exhausted from the sectors and the central channel at the rate required by the higher speed of rotation. A vacuum is therefore created in the sectors during evacuation, retarding the removal of the filtered fluid from the sectors.

OBJECT OF THE INVENTION

The object of the present invention is to create a method for substantially increasing the rate of water exhaustion of the disc filter, thereby enabling the capacity of the filter to be increased. The method of the invention is therefore characterized in that a means is provided for ambient air to enter the filter disc sectors and the central shaft channel communicating with them, and/or that air is blown into them to remove the filtered fluid from the sectors and the central passage. This prevents the creation of a vacuum in the filter sectors during exhaustion.

An advantageous embodiment of the method of the invention is characterized in that the said means of air supply is provided at the filter sectors themselves, close to the circumference of the discs.

Another advantageous embodiment of the invention is characterized in that the air supply is provided for by air admission through the central shaft.

A disc filter employing the method of the invention is characterized in that the disc filter is provided with a means of admitting ambient air into te filter sectors and the central channel communicating with them or with equipment for blowing air into the sectors and the channel to exhaust the filtered fluid from them.

A further advantageous embodiment of the invention is characterized in that an air inlet pipe is incorporated in the central shaft end plate to allow ambient air to enter the filter sectors and the central passage.

The most important advantage of the invention is that it enables the water to be exhausted considerably faster and more efficiently, so that the capacity of the disc filter can be substantially increased by increasing its speed of rotation. In addition, the method improves the dry content of the layer of fibers gathering on the filter nets.

BRIEF DESCRIPTION OF THE DRAWINGS

In the following, the invention is described in detail, reference being made to the drawings attached, wherein.

DETAILED DESCRIPTION OF THE MOST PREFERRED EMBODIMENTS

Figure 1:
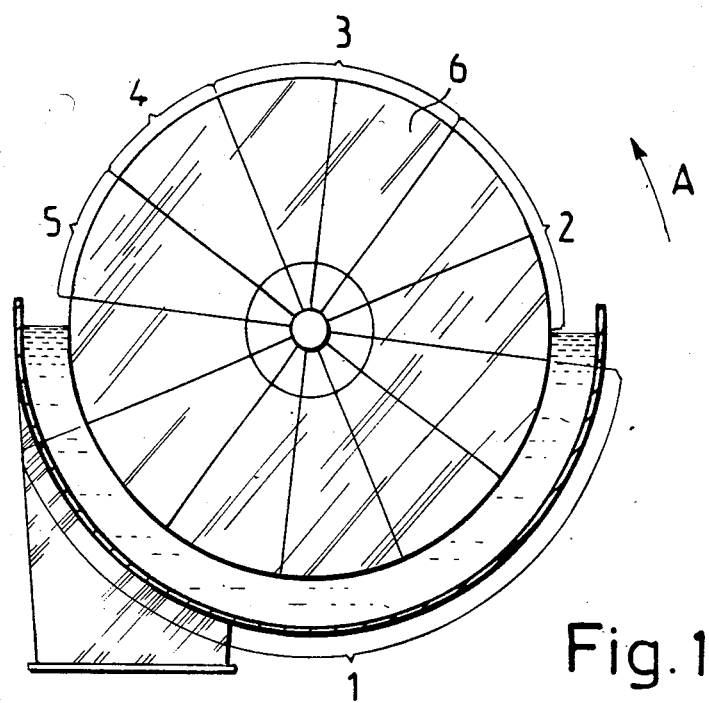
FIG. 1 presents a disc of a disc filter, seen from the direction of its axis of rotation.

FIG. 1 presents a disc filter rotating in a suspension containing fibers, and particularly one of its discs. The disc is composed of several sectors 6, each of which goes through phases 1–5 as the disc rotates, the direction of rotation being as indicated by the arrow A. During phase 1, a layer of fibers from the fluid is deposited on the net surfaces of the filter sectors. In phase 2, the layer of fibers thus gathered is dried, and in phase 3 the central channel is evacuated. In phase 4, the layer of fibers is removed from the sector surfaces and finally in phase 5 the filter nets are washed.

Figure 2:
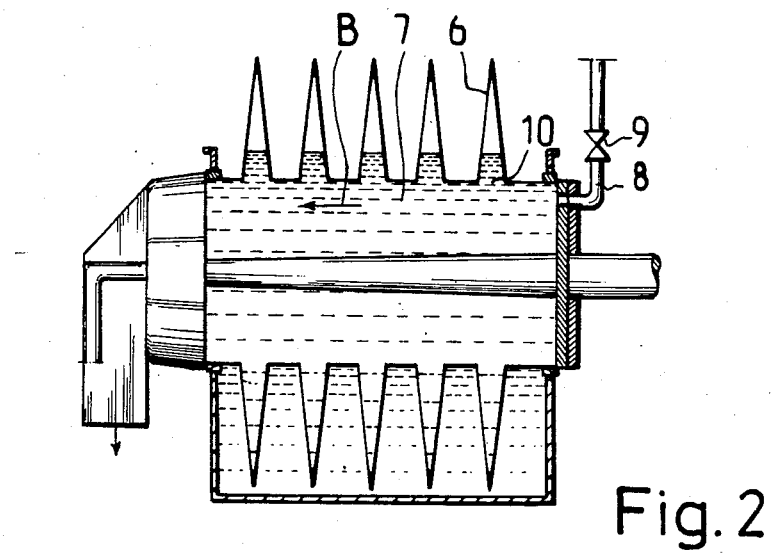
FIG. 2 presents a sectional view of a disc filter according to the invention.

FIG. 2 presents a section through a disc filter according to the invention. In this figure, the hollow filter sectors 6 seen above the central shaft are in phase 3, when the water is flowing down from the sectors into the central channel 7 through the apertures 10 at the base of the sectors. From here, the water is drained from the disc filter under section in the direction indicated by the arrow B passing out through outlet 11 at one end of the disc filter. In conventional disc filters, a vacuum is created in this phase inside the sectors 6, limiting the rate of exhaustion of the water.

In the embodiment presented in FIG. 2, the central channel 7 is provided with an air inlet pipe 8, allowing ambient air to enter the passage, which makes it possible to avoid the creation of a vacuum in the filter sectors. The water therefore flows at a considerably faster rate, enabling the rotational speed of the disc filter to be increased. A valve 9 is provided for adjustment of the amount of air admitted. The right moment for opening the air inlet valve is about 0°–30° before phase 4 or removal of the fiber layer.

In an advantageous embodiment of the invention, not shown by the drawings, a means for air intake is arranged at the circumference of the sectors. This arrangement further improves the water exhaustion performance of the disc filter. Air intake through the sectors may be arranged for instance by applying blasts of air onto the sectors at exactly the right moments to disrupt the fiber layer deposited on the sector surfaces and thus to allow air to enter the sectors. Also, there is nothing to prevent a simultaneous use of both methods of air intake. The air intake may be arranged radially through the central cylinder or by means of a valve at the circumference of the sectors.

It is obvious to a person skilled in the art that the invention is not restricted to the examples of embodiments discussed above, and that it can instead be varied within the scope of the following claims. Thus the disc filter may be constructed as shown in FIG. 1, involving removal of the fiber layer (phase 4) only just before the disc sector is again immersed in the suspension as the disc rotates, or it may be of a conventional construction involving removal of the fiber layer at a phase closer to the phase when the sector emerges from the suspension.

We claim:

1. A method comprising removing filtrate from a disc filter for filtering fluids containing fiber-like solid materials for increasing the speed of rotation of the disc filter retarded by the presence of a vacuum therein and thereby increasing the capacity of the disc filter, by providing the filter having an axially extending central shaft forming an axially extending central channel (7), a plurality of hollow discs are arranged serially along the axial direction of and extend radially outwardly from the central shaft, the discs each include a number of sectors (6) extending radially outwardly from the central shaft and communicating with the central channel through apertures (10), the central shaft having a first end and a second end spaced apart in the axial direction and defining the opposite ends of the central channel (7), rotating the disc filter through a body of fluid containing fiber-like material and having a fluid level so that the lower half of the disc filter is below the fluid level and the upper half of the disc filter is above fluid level, sucking the fluid out of the central passage at the first end of the central channel, and at the same time placing the sectors (6) and the central channel (7) located above the fluid level in communication with at least one of ambient air and blowing air therein.

2. A method, as set forth in claim 1, including the step of supplying air into the sectors of the discs located above the fluid level at a location in the sectors spaced outwardly from the central shaft.

3. A method, as set forth in claim 1, comprises supplying ambient air through an inlet in the second end of the central channel (7).

4. A disc filter comprising: means for removing filtrate from fluids containing fiber-like solid materials for increasing the speed of rotation of the disc filter reacted by the presence of a vacuum therein and thereby increasing the capacity of the disc filter, including, an axially elongated central shaft defining a central channel (7) having a first end and a second end spaced apart in the axial direction, a plurality of hollow discs arranged serially along said central shaft and extending radially outwardly from said central shaft, said discs each comprising a plurality of separate sectors (6) each communicating through apertures with said central channel (7), an outlet (11) from said central channel (7) at the first end thereof for removing filtrate from said central channel, an inlet pipe (8) communicating with central channel (7) at the second end thereof for supplying air into the central channel, a valve located in said inlet pipe for controlling the flow of air through said inlet pipe into said central channel, so that air can be introduced into the central channel and the sectors when filtrate is removed from the outlet for avoiding the developement of a vacuum within the sectors of the disc and thereby increasing the capacity of the disc filter.

5. A disc filter as set forth in claim 4, including a fluid bath having a fluid level, said disc filter located within said fluid bath so that the lower half of said disc filter is located below the fluid level and the upper half of said disc filter is located above the fluid level, and with said air inlet pipe being located above said fluid level.

* * * * *